Sept. 17, 1963 O. W. BONNAFE 3,103,852
BROACHING APPARATUS
Filed March 16, 1961 3 Sheets-Sheet 1

Inventor
Oliver W. Bonnafe
by Roberts, Cushman & Grover
Attys

Inventor
Oliver W. Bonnafe
by Roberts, Cushman & Grover
Attys

Sept. 17, 1963     O. W. BONNAFE     3,103,852
BROACHING APPARATUS

Filed March 16, 1961     3 Sheets-Sheet 3

Inventor
Oliver W. Bonnafe
by Roberts, Cushman & Grover
Att'ys

3,103,852
BROACHING APPARATUS

Oliver W. Bonnafe, Hudson, Mass., assignor to The Lapointe Machine Tool Company, Hudson, Mass., a corporation of Maine
Filed Mar. 16, 1961, Ser. No. 96,185
7 Claims. (Cl. 90—97)

This invention relates to broaching machines of the kind in which a carriage is mounted for movement parallel to the direction of intended movement of the broach, and movement is imparted to the broach by a cantilever-supported arm projecting from the carriage to the distal end of which the broach is connected. As thus constructed, a very high bending couple is set up during the working stroke which tends to tilt the carriage relative to the track and hence to cause binding and this, in turn, results in chatter, vibration, loss of precision and inefficient use of power. The foregoing difficulties are aggravated when hydraulic means is employed for effecting movement of the carriage.

The principal objects of this invention are therefore to provide a drive for apparatus of the foregoing kind which will eliminate binding of the carriage on the track and hence restore precision, minimize wear and reduce the power necessary to effect the broaching operation; to provide a drive which applies the pulling force unyieldingly, uniformly and rapidly; and to provide a drive which can be installed without excessive machining, with ready available material, and which requires no more than ordinary maintenance.

As herein illustrated, the broach is connected to the distal end of an arm extending from a carriage slidably mounted on a track for movement parallel to the direction of movement of the broach, but in contrast to prior machines, the pull is applied in a plane passing through the axis of the broach and parallel to the track. More specifically, the carriage functions solely as a guide, and movement is imparted directly to the arm in a plane passing through the axis of the broach and parallel to the track by a pair of screws threaded through openings in the arm diametrically opposite the axis of the broach. Ball screws of the same hand are employed and there is means for rotating them in the same direction.

Figure 1:
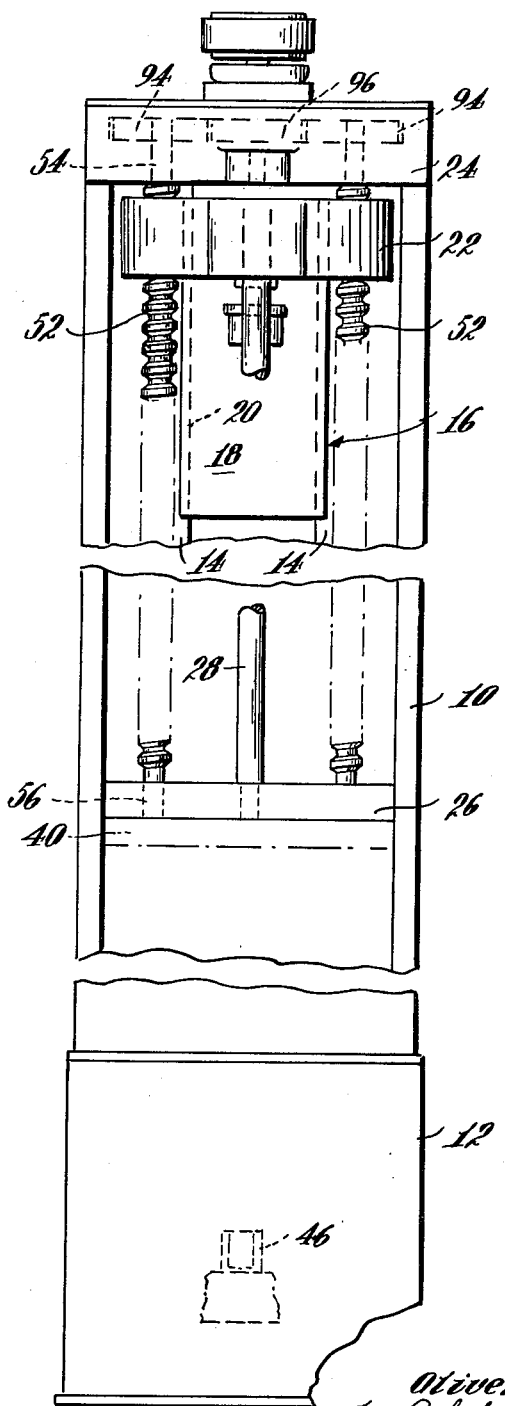
Figure 2:
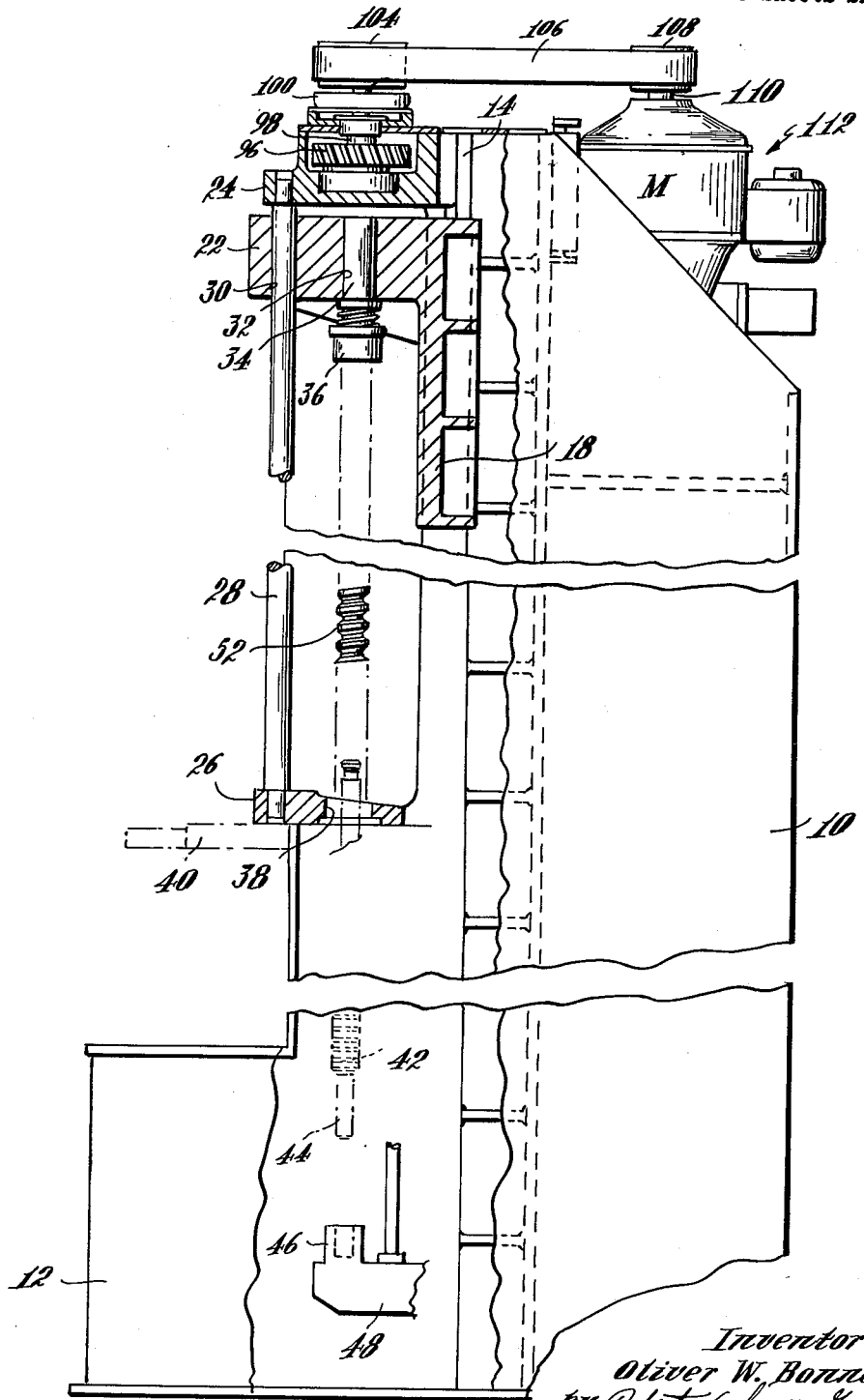
Figure 3:
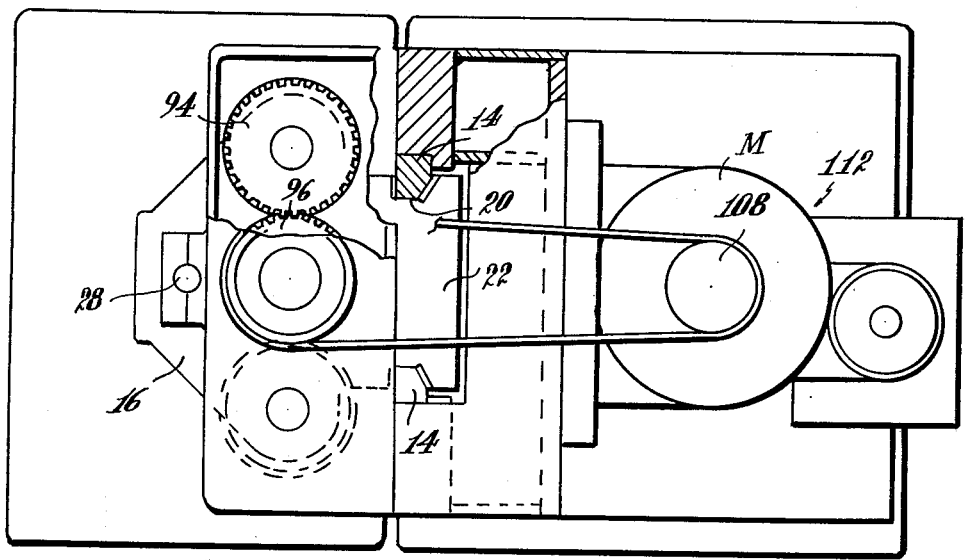
Figure 4:
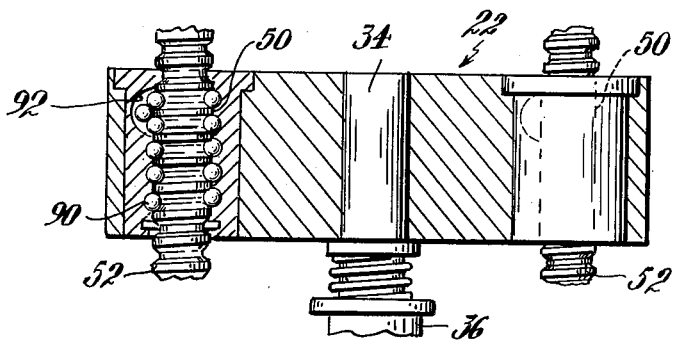

The invention will now be described in greater detail with reference to the accompanying drawings wherein:

FIG. 1 is a front elevation of the machine;
FIG. 2 is a side elevation broken away in part and partly in section;
FIG. 3 is a top view of the machine partly in section; and
FIG. 4 is a detail of the ball screw and nut assembly employed herein.

The machine, as shown herein, is of the vertical type, the invention being particularly applicable to this type of machine because the full weight of the branch is borne by the arm through which the pull is applied, however, it may advantageously be used for a horizontal type of broaching machine.

As shown (FIGS. 1 and 2), there is a vertically disposed frame 10 having a base 12 which provides a support for spaced parallel, vertically disposed tracks 14—14 (FIG. 3), between which is slidably mounted a carriage 16. The carriage 16 is substantially L-shaped in vertical section, as shown in FIG. 2, having a leg 18 containing, at its opposite edges, grooves 20—20 which engage the tracks 14—14 and provide relatively long bearing surfaces for guiding the carriage. An arm 22 extends horizontally forward from the leg between vertically spaced, horizontally disposed parts 24 and 26 at the top and intermediate the top and bottom of the frame, situated at a spacing which corresponds substantially to the stroke of the broach. A rigid guide rod 28 is mounted midway between the sides of the frame between the parts 24 and 26 (FIGS. 1 and 2), and the forward end of the arm 22 contains a vertically disposed opening 30 through which the guide rod 28 passes and upon which the arm is free to slide.

The arm 22 has midway between its opposite sides and between its leg 18 and the guide rod 28 a vertically disposed opening 32 in which there is mounted a post 34, to the lower end of which is secured a broach clamp 36 of conventional construction for holding the upper end of the broach suspended in a perpendicular position, with its axis parallel to the tracks and coinciding with the center of the opening 38 in the part 26, through which it is adapted to be moved. The work to be operated upon is supported beneath the part 26 and is movable into and out of position for broaching by means of a fixture 40 slidably supported on the frame, so that it may be drawn forwardly to a position for receiving a workpiece and then slid rearwardly to dispose the workpiece beneath the opening 38.

In use, the broach 42, which is shown in FIG. 2, is placed with its lower end 44 in a foot socket 46 mounted on a horizontally disposed arm 48, the latter being supported by the frame for vertical movement and being movable upwardly to raise the upper end of the broach through the work and through the opening 38 into engagement with the clamp 36, the latter being lowered for this purpose from its upper position, as shown in FIG. 2, into engagement with the upper side of the part 26. When the upper end of the broach has been gripped by the clamp 36, the arm 22 is elevated and the arm 48 is simultaneously moved upwardly at the same speed, so that the socket 46 remains engaged with the lower end of the broach throughout the entire pulling stroke to hold the broach on center. A hydraulic motor is employed to lift the arm 48 and is controlled to effect movement of the arm upwardly in synchronism with the elevation of the arm 22, however, since the specific details of the supporting arm 48 and the mechanism for effecting its movement are only ancillary to the invention, further details will be omitted.

As has been previously indicated, the primary consideration is to effect movement of the arm 22 without the carriage binding on the track regardless of the magnitude of pull. To this end, as shown in FIGS. 3 and 4, the arm 22 is provided with vertically disposed screw-threaded openings 50—50 (FIG. 4), the axes of which lie in a plane parallel to the track and diametrically opposite the axis of the post 34 which supports the clamp 36 for holding the broach. A pair of ball screws 52—52, of the same hand, are journaled at their upper and lower ends 54 and 56 in the frame parts 24 and 26, with their axes parallel to the track and coinciding with the center lines of the openings 50—50, through which they pass and with the threads of which they mesh. The threading of the screw-threaded openings 50—50 and the threading 52—52 of the screws are designed to provide thread passages which accommodate balls 90 for circulation through the thread passages endlessly by one or more conductor passages 92 (FIG. 4), which receive balls from certain of the thread passages and return them to thread passages rearwardly of the direction in which they move in conventional fashion, this type of construction being technically known as a "ball screw drive."

A helical gear 94 is fixed to the upper end of each screw and a helical drive gear 96 is mounted between them on an axis coinciding with the axis of the post 34 in mesh with the gears 94—94. The gear 96 is fixed to the lower end of a shaft 98 journaled in the frame part 24. A pulley 104 is fixed to the shaft 98 and rotation is imparted to the shaft 98 by a belt 106 entrained about the pulley 104 and a pulley 108 fixed to a shaft 110 extending from a motor M. By driving the two gears 94—94 through a common drive gear 96, it becomes unnecessary to employ right and left-hand screws and hence difficulties involved in mounting left and right-hand screws in such fashion as to insure synchronism of lead is avoided. A brake 100 is mounted on the shaft 98 and, in operation, when the broach reaches the upper end of its working stroke it actuates a switch which stops the motor M and applies the brake 100. The pulley 108 is fastened to the motor shaft 110 by a shear pin to prevent damage to the broach in the event of malfunctioning.

The ball screws, being disposed at opposite sides of the axis of pull, insure a uniform pull at the same speed so that there is no tendency for the carriage to skew during its vertical movement. Moreover, since the screws apply the pull in a plane passing through the axis of the broach where the reaction to the pull exists, tilting of the slide forwardly relative to the vertical is avoided so that the carriage does not bind on the tracks. The screws apply a uniform and positive, that is, a non-yielding application of force, in contrast to hydraulic cylinders which are prone to produce chatter and uneveness due to the fact that, although oil is supposed to be incompressible, it is actually somewhat elastic due to the presence of included air. It is required that the driving screws be of the ball type for it would be impossible to obtain the speed necessary for the broaching stroke with conventional screws due to the high amount of friction involved; moreover, the power input necessary to drive the screw at high speed and the resulting wear would be excessive.

With the machine set up, as described above, so that the broach can be moved uniformly and rapidly by means of a pair of spaced ball screws without binding, chattering, and the like, it is possible to reduce the operating time required to process a work-piece to a fraction of what was formerly required with the conventional hydraulically-operated machine and with much greater precision. In fact, gear blanks, the centers of which were formerly broached to shape on conventional hydraulic machines, required as much as thirty minutes for processing per unit, whereas the instant machine performs the same operation in fifteen to twenty seconds.

As previously stated, while the drive shown herein is applied to a vertical broach and is especially adapted for this purpose, many of the features which constitute an advantage in the vertical machine are of equal advantage for use in a horizontal machine.

It should be understood that the present disclosure is for the purpose of illustration only and that this invention includes all modifications and equivalents which fall within the scope of the appended claims.

I claim:

1. In a broaching machine having a support including a work holder, a carriage, means on the support supporting the carriage at one side of the work holder for sliding movement relative thereto along a path perpendicular to the work holder, an arm on the carriage extending therefrom crosswise of the work holder, a broach holder on the arm spaced from the carriage to which an end of a broach may be connected for effecting lengthwise movement of the broach toward and away from the work holder for operating on a work piece fixed to the work holder, and means for effecting movement of the carriage, characterized in that it comprises a pair of spaced parallel ball-lead screws rotatably mounted on the support at opposite sides of the broach holder in a plane containing the axis of the broach holder and parallel to the carriage support, ball nuts on the arm at opposite sides of the broach holder through which the ball-lead screws pass, and means for effecting rotation of the ball-lead screws in the same direction.

2. Apparatus according to claim 1, wherein the ball-lead screws are of the same hand.

3. Apparatus according to claim 1, wherein the means for effecting rotation of the ball-lead screws comprises a gear fixed to the upper end of each lead screw, a drive gear situated between and in mesh with the gears fixed to the ends of the lead screws, and a shaft fixed to the drive gear by means of which it may be rotated.

4. In a broaching machine, a support including a work holder, a carriage slide at one side of the work support, a carriage on the slide movable along a path parallel to and perpendicular to the work support, a cantilever supported arm on the carriage extending across the work support, a broach holder fixed to the arm for supporting a broach at one end for movement of the broach lengthwise along a perpendicular to the work holder, and means for effecting movement of the carriage comprising ball-lead screws rotatably mounted on the support with their axes situated at opposite sides of the broach holder and in a plane passing through the axis of the broach holder and parallel to the support, ball nuts on the arm at opposite sides of the broach holder through which the ball-lead screws pass, and means for effecting rotation of the ball-lead screws in the same direction.

5. In a broaching machine, a support including a work holder, a track on the support perpendicular to the work holder, a carriage slidable on the track, a cantilever arm on the carriage projecting laterally therefrom substantially parallel to the work holder, a clamp mounted on the arm to which an end of a broach is adapted to be connected for movement in a direction parallel to the track and perpendicular to the work holder, and means for effecting movement of the arm comprising a pair of spaced parallel ball-lead screws rotatably mounted on the support with their axes situated at opposite sides of the clamp and in a plane passing through the axis of the clamp and parallel to the support, ball nuts on the arm at opposite sides of the clamp through which the ball-lead screws pass, and means for effecting rotation of the ball-lead screws in the same direction.

6. In a broaching machine, a support having a horizontal work holder and vertically disposed tracks situated at one side thereof, a carriage slidably mounted on the tracks, a cantilever supported arm mounted on the carriage in a horizontal position substantially parallel to the work support, a clamp on the arm adapted to hold a broach in suspension with its axis parallel to the track, and means for effecting movement of the arm comprising a pair of spaced parallel ball-lead screws rotatably mounted on the support with their axes situated at opposite sides of the clamp in a plane passing through the axis of the clamp and parallel to the tracks, ball nuts on the arm at opposite sides of the clamp through which the ball-lead screws pass, and means for effecting rotation of the ball-lead screws in the same direction.

7. Apparatus according to claim 6, wherein there is a guide rod on the support parallel to the track and the distal end of the arm contains an opening slidably engaged with the guide rod.

References Cited in the file of this patent

UNITED STATES PATENTS

| 303,621 | Colburn | Aug. 19, 1884 |
| 1,296,535 | Lapointe et al. | Mar. 4, 1919 |
| 1,310,933 | Suverkrop et al. | July 22, 1919 |
| 3,023,631 | Curtis | Mar. 6, 1962 |